UNITED STATES PATENT OFFICE.

LOUIS PAUWELS, OF PATERSON, NEW JERSEY.

SOLDERING COMPOUND.

SPECIFICATION forming part of Letters Patent No. 559,809, dated May 12, 1896.

Application filed November 29, 1895. Serial No. 570,559. (No specimens.)

*To all whom it may concern:*

Be it known that I, LOUIS PAUWELS, a subject of the King of Belgium, residing in Paterson, county of Passaic, and State of New Jersey, have invented certain new and useful Improvements in Soldering Compounds; and I do hereby declare the following to be a full, clear, and exact description of the invention, such as will enable others skilled in the art to which it appertains to make and use the same.

The object of my invention is to provide a compound for soldering or welding metals—such as steel, iron, &c.—which when used will amalgamate with the metals, and thus form a strong and indestructible joint.

The compound consists of borate of iron, four pounds, and of filings of steel, six pounds, which ingredients are thoroughly mixed. In preparing this compound common borax (ten pounds) is placed in an iron vessel and heated until melted. The water (about six pounds) evaporates and the melted borax enters into chemical composition with the iron of the vessel, and thus produces borate of iron. This is then ground to powder and mixed with the filings.

In using the above-named composition the portion of the metals to be soldered or welded are cleaned and covered with said compound and are then heated until they become red-hot. The compound amalgamates with the metal and the joint so produced is strong and indestructible.

Heretofore compounds were used for similar purposes, such compounds consisting of calcined borax and iron filings, and sometimes in combination with prussiate of potassa or other equivalent ingredients; but such compounds did not prove to be of practical value.

When iron filings instead of filings of steel are used in the compound to be applied in welding pieces of steel, carbon from the latter is withdrawn to combine with the iron of the compound, and this withdrawal of carbon necessarily weakens the metal, and consequently renders the joint imperfect. A high heat is not necessary in welding with my compound, and as the steel filings thereof already possess an adequate amount of carbon there is no danger of weakening the joint by the subtraction of carbon from the pieces of steel in the process of welding or by overheating the metal. Moreover, steel filings melt at a lower temperature than iron filings, though they contain carbon which is almost completely infusible.

What I claim as new, and desire to secure by Letters Patent, is—

The within-described compound consisting of borate of iron, four pounds, and of steel filings, six pounds, substantially as specified.

In testimony that I claim the foregoing I have hereunto set my hand this 23d day of November, 1895.

LOUIS PAUWELS.

Witnesses:
ALFRED GARTNER,
KRINE PATMOS.